Patented Aug. 21, 1923.

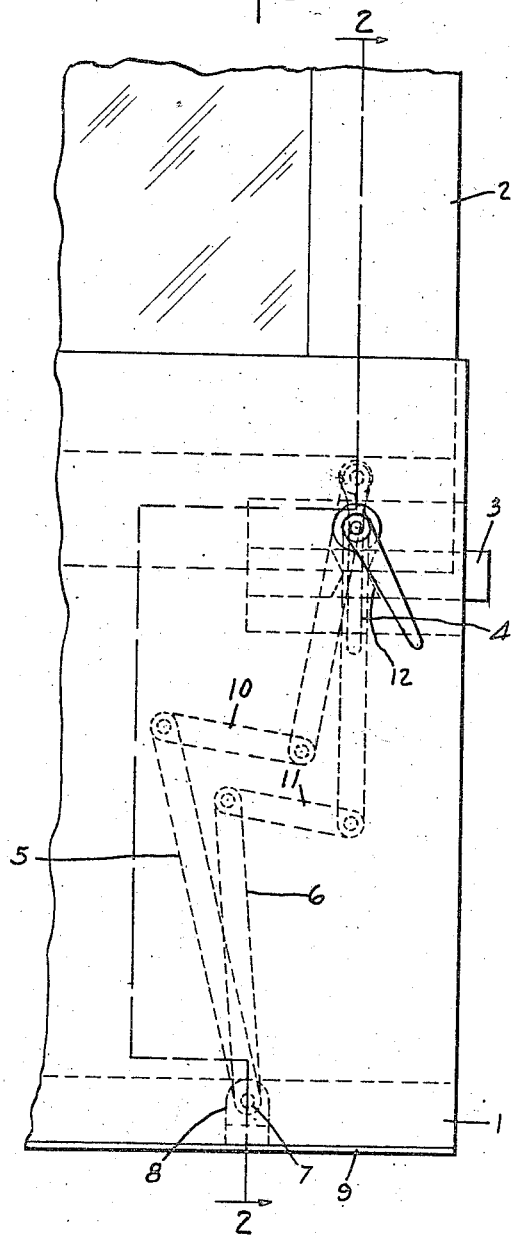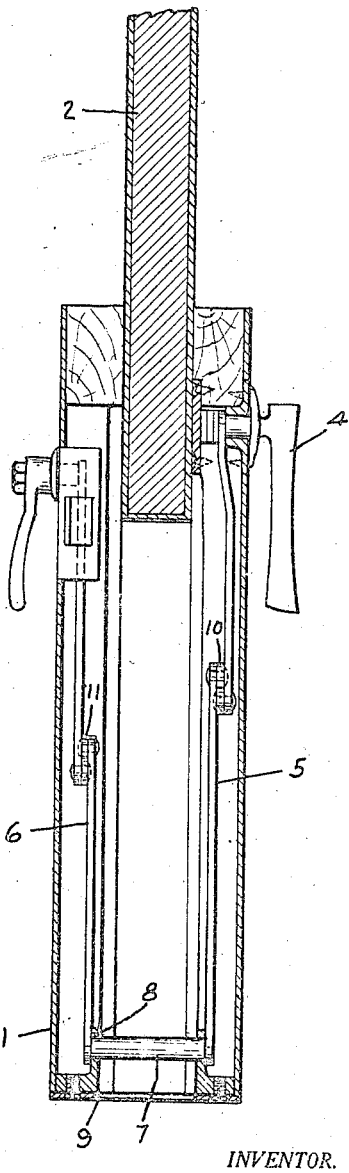

1,465,399

UNITED STATES PATENT OFFICE.

FREDERICK KLEINSMITH, OF INDIANAPOLIS, INDIANA.

OPERATING MEANS FOR AUTOMOBILE DOOR LATCHES.

Application filed November 21, 1921. Serial No. 516,642.

*To all whom it may concern:*

Be it known that I, FREDERICK KLEINSMITH, a citizen of the United States, residing at Indianapolis, in the county of Marion and State of Indiana, have invented certain new and useful Improvements in Operating Means for Automobile Door Latches, of which the following is a specification.

This invention relates to operating means for automobile door latches and is primarily an improvement over that form of device shown in my prior Patent No. 1,348,882.

This form of device is designed primarily for use where an extension member is slidably mounted within the door construction so that when the car is to be used as an open car the sliding section may be lowered into the door construction, and one object of the invention is in so arranging the operating mechanism for the door latch that the movable member may pass between the latch and one of the operating handles therefor.

A further feature of the invention is in so constructing the levers employed for operating the latch that the leverage thereof will be greatly increased.

A further feature of the invention is in so constructing the levers that they may be operated to release the latch by rotating the releasing handle.

Other objects and advantages will be hereinafter more fully set forth and pointed out in the accompanying specification.

In the accompanying drawings,

Figure 1 is a detail elevation of a portion of a door showing the latch operating means by dotted lines, and Figure 2 is a sectional view thereof as seen on line 2—2, Figure 1.

Referring to the drawings, 1 indicates an automobile door which is hollow to receive the vertically movable member 2, which is preferably a frame provided with a pane of glass and which is to be raised when the car is to be used as a closed car, and lowered into the door when the car is to be used as an open car, or partially raised or lowered for ventilating purposes. In order to form the frame 2 substantially the same width as the door 1, the latch 3, employed for holding the door in closed position, is preferably placed adjacent one face of the door so that the frame 2 will slide past the latch, and in order to operate the latch to release the same from the opposite side of the door from that occupied by the latch, an operating handle 4 is pivotally mounted at one end through the wall of the door and is connected to the latch 3 through the medium of levers 5 and 6, the lever 5 extending downwardly from the operating handle 4 while the lever 6 is connected with and extends downwardly from the latch 3.

The lower ends of the levers 5 and 6 are rigidly connected together by a shaft 7, which shaft is pivotally mounted in a bearing 8 located in the lower portion of the door, and for convenience of inserting or removing the levers and bearing, a plate 9 is secured to the lower edges of the door upon which the bearing 8 is mounted.

In my former patent, the levers 5 and 6 are shown as rigid throughout their length thereby requiring a lateral swinging movement of the levers for releasing the latch, but in the present instance a pivoting handle is employed for releasing the latch, hence the levers 5 and 6 are formed in two sections, and these sections are connected together by means of links 10 and 11, respectively, said links extending substantially horizontally so that the latch will be released by pivoting the handle 4 in its bearing through the door, one section of the lever 5 being fixed to the pivoting end of the handle.

The upper portion of the lever 6 may be connected with the latch 3 or latch bolt in any suitable manner, the extreme upper end of the section co-operating with the latch extending above the latch where it is pivoted, the lever in the present instance projecting through a notch 12 in the bolt of the latch 3, so that by swinging the lever the bolt will be moved lengthwise.

By arranging the levers in this manner and positioning the bearing 8 adjacent the lower edge of the door, the frame 2 will readily pass within the door and between the latch and the handle for operating the same. By arranging the levers in sections and connecting them together by means of links, as shown in the present construction, a pressure on the free edge of the operating handle 4 will serve to operate the latch as readily as when the levers are constructed of single elements and a lateral swinging movement imparted to the upper ends thereof, and it will be thoroughly understood that the form of latch shown in my former patent may be operated equally as well as with the present construction.

It will further be seen that by constructing the levers as shown, the installation or removal of the parts will be greatly facilitated and that said levers may be readily applied to use with various forms of locks or latches.

Having thus fully described my said invention, what I claim as new and desire to secure by Letters Patent, is:

1. The combination with an automobile door a frame slidable in said door and a securing latch connected to the door at one side of the path of the frame, of a pair of levers fixed together at their lower ends, and extending on opposite sides of the path of the frame, said levers being formed in sections, links for connecting said sections of the levers together, means for pivotally mounting the lower ends of the levers, and pivoted means connected with the levers for moving the same for releasing said latch.

2. The combination with an automobile door, a frame slidable in said door and a securing latch connected to the door at one side of the path of the frame, a system of levers extending from a point adjacent the top of the door on each side thereof to a point adjacent the bottom of the door, a connection for the lower ends of the said systems of levers extending transversely through the door and below the path of the frame, a connection between the latch and one of the systems of levers, a handle pivotally secured to the upper end of the system of levers lying on the opposite side of the frame from that of the said latch whereby said handle may be rotated about its pivotal point to operate the latch through the systems of levers, substantially as set forth.

3. The combination with an automobile door, a frame slidable in said door and a securing latch connected to the door at one side of the path of the frame, a system of levers extending on both sides of the path of the frame from points substantially in lateral alignment with each other and also the latch, a connection for the levers extending transversely through the door below the path of the frame, a connection between the latch and one of the systems of levers, a handle pivoted on each side of the path of the frame to the said system of levers at the said points of alignment whereby either handle may be rotated about the axis of the said pivot point to operate the latch, substantially as set forth.

In witness whereof, I have hereunto set my hand and seal at Indianapolis, Indiana, this 18th day of November, A. D. nineteen hundred and twenty-one.

FREDERICK KLEINSMITH. [L. S.]

Witnesses:
CAREY S. FRYE,
M. L. SHULER.